United States Patent [19]

Delfino et al.

[11] Patent Number: 5,203,631
[45] Date of Patent: Apr. 20, 1993

[54] NARROW SPECTRAL BAND PYROMETRY

[75] Inventors: Michelangelo Delfino, Los Altos; David T. Hodul, Oakland, both of Calif.

[73] Assignee: Varian Associates, Inc., Palo Alto, Calif.

[21] Appl. No.: 779,444

[22] Filed: Oct. 18, 1991

[51] Int. Cl.$^5$ .............................. G01J 5/00; G01J 5/58
[52] U.S. Cl. ..................... 374/123; 374/121; 374/127; 374/130
[58] Field of Search ............... 374/120, 121, 123, 127, 374/130

[56] References Cited

U.S. PATENT DOCUMENTS

| | | | |
|---|---|---|---|
| 2,912,862 | 11/1959 | Machler et al. | 374/123 |
| 3,245,261 | 4/1966 | Buteux et al. | 374/123 |
| 5,009,926 | 4/1991 | Fukuda | 427/55 |

FOREIGN PATENT DOCUMENTS

| | | | |
|---|---|---|---|
| 0018642 | 11/1980 | European Pat. Off. | 374/123 |
| 0687349 | 9/1979 | U.S.S.R. | 374/121 |
| 0744914 | 2/1956 | United Kingdom | 374/123 |

OTHER PUBLICATIONS

V. M. Braude et al. "An Instrument for the Contactless Measurement of the Surface Temperature of Glass" *Glass and Ceramics* (USA) vol. 30 No. 1-2 (Jan.-Feb. 1973) pp. 89-91.

*Primary Examiner*—William A. Cuchlinski, Jr.
*Assistant Examiner*—W. Morris Worth
*Attorney, Agent, or Firm*—Edward H. Berkowitz

[57] ABSTRACT

A narrow-band pyrometric system measures the temperature of an object (1), such as a semiconductor wafer (1), that is coated with a film (2) having an absorption band. The thermal radiation emitted by the coated object (1) passes through a lens (3) and aperture (4), and then a filter (5). The passband of this filter (5) falls within the absorption band of the film (2). The transmitted radiation is then collected by the radiation detector (6), which measures the intensity. The detected radiation is at a wavelength where the heated object (1) is substantially opaque, and the effect of uncertainties in the emissivity on the temperature measurement is minimized. Thus, a method is provided to coat the object (1) with a film (2) of material having an absorption band encompassing the filter (5) passband, and a thickness sufficiently great that the object (1) appears opaque when viewed through the filter (5). Alternatively, the film (2) material and thickness must be such that the emissivity is constant and accurately known in the passband wavelength region.

14 Claims, 4 Drawing Sheets

NARROW SPECTRAL BAND PYROMETRY

BACKGROUND OF THE INVENTION

1. Field of the Invention

This invention pertains generally to the field of pyrometric devices and methods for temperature measurements, and more particularly, to pyrometers utilizing a narrow spectral band in the infrared region.

2. Description of the Background Art

Infrared pyrometry is an attractive temperature measurement technique. It is rapid and requires no physical contact with the object in which the temperature is being measured. Pyrometers operate by sensing the thermal radiation emitted by the heated object, and using the intensity of this detected radiation to determine the temperature of the object.

For a perfectly emitting and absorbing object (a "blackbody"), this determination is made by using the well-known "blackbody spectrum". This spectrum is given by the Planck radiation law, which describes the radiation intensity as a unique function of temperature and wavelength that is the same for all materials. However, in real objects the emitted thermal radiation depends also on the properties of the material surface. These properties are usually expressed as the emissivity of the material, which is the ratio of the radiation intensity actually emitted to that which would be emitted if the material were a perfect blackbody. This emissivity is a function also of the radiation wavelength and the material temperature. The value of the emissivity must be known in order to determine the temperature of the object from the intensity of the detected radiation. In the pyrometric method, the uncertainties in the emissivity are a fundamental limitation on the accuracy with which the temperature can be measured.

For example, infrared pyrometry is commonly employed in rapid thermal processors (RTP) to measure semiconductor wafer temperatures. The state of this technology has been reviewed in the article by L. Peters, "The Hottest Topic in RTP", published in *Semiconductor International*, Vol. 14, No. 9, August 1991, pp. 56–62. This article discusses various available RTP systems and pyrometric temperature monitors. The improvement of temperature control by minimizing the effect of emissivity variations is noted to be an important objective.

Narrow-band (narrow passband) pyrometers utilize a filtering technique to limit the range of radiation wavelengths measured by the system. In such systems the emissivity values are important only in the passband of the filter. It is desirable to choose the band for a range of wavelengths in which the emissivity is well known and constant. However, the emissivity generally varies with the temperature of the object and the surface characteristics.

In the case of silicon, the emissivity at wavelengths longer than the band edge is a strong function of the concentration of charge carriers. This concentration, in turn, depends on temperature. At low temperatures, which corresponds generally to low carrier concentration, silicon is nearly transparent. By increasing the temperature to approximately 500° C., the emissivity of a silicon wafer of reasonable thickness becomes substantially constant at a value of about 0.7. Thus the accuracy of the normal pyrometric method in silicon at temperatures below 500° C. is limited by the uncertainty in the emissivity values. The transparency of silicon at these temperatures also allows further errors arising from radiation from other sources that is transmitted through the wafer.

A further limitation in the pyrometric method is described in the article by D. W. Pettibone, J. R. Suarez and A. Gat, "The Effect of Thin Dielectric Films on the Accuracy of Pyrometric Temperature Measurement", *Materials Research Society Symposium Proceedings*, Vol. 52, pp. 209–216 (1988). These authors discuss the substantial effect of oxide and nitride films on the emissivity of silicon, and the resulting errors in pyrometric temperature measurements. In particular, the article reports the results of narrow-band pyrometric measurements at wavelengths around 3.5 microns, for silicon wafers having oxide films of various thicknesses. For temperatures between 650° and 1100° C., these measurement errors were of the order of 10° to 50° C. The authors were unable to make these measurements below 650° C.

DISCLOSURE OF INVENTION

The present invention provides a narrow-band pyrometric system for measuring the temperature of an object, such as a semiconductor wafer (1), that is coated with a film (2), having an absorption band. The thermal radiation emitted by the coated object (1) passes through a lens (3) and aperture (4), and then a filter (5). The passband of this filter (5) falls within the absorption band of the film (2). The transmitted radiation is then collected by the radiation detector (6), which measures the intensity.

The detected radiation is at a wavelength where the heated object appears substantially opaque when viewed with the combination of filter (5) and absorption film (2), such film 2 exhibiting substantially constant emissivity, and therefore the effect of uncertainties in the emissivity on the temperature measurement is minimized. Thus the method of this system is to coat the object with a film of material having an absorption band encompassing the filter passband, and a thickness sufficiently great that the object appears opaque when viewed through the filter. The film material and thickness must be such that the emissivity of the coated film is constant and accurately known in the passband wavelength region. For a given coating material the filter is chosen to pass a wavelength band lying within the absorption band of the material.

DETAILED DESCRIPTION OF THE PREFERRED EMBODIMENTS

Figure 1:
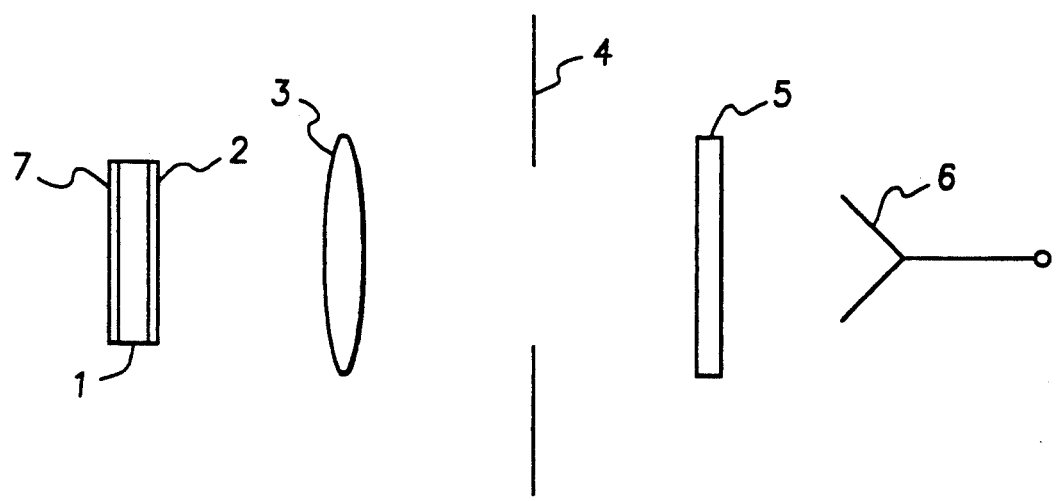
FIG. 1 is a schematic diagram of a pyrometric system according to the present invention.

The schematic diagram of FIG. 1 shows the basic elements of a pyrometric system for measuring the temperature of a heated object. For purposes of illustration in the following description, this object is taken to be a silicon wafer 1. This wafer 1 is coated with a film 2 of silicon dioxide on the emitting surface, facing the pyrometer detector 6. The opposite side of the wafer 1 may be coated also with a similar film 7. This film 7 has a minor effect on the measurement results. The thermal radiation emitted by the wafer 1 coated with the film 2 is collected by the lens 3 and aperture 4, and focused through the filter 5 into the pyrometric detector 6, which may be a photoconductive cell. The output of the detector 6 indicates the intensity of this radiation.

This silicon wafer 1 is typically 500 microns in thickness. The oxide film 2 on the front surface of the wafer 1 is of thickness typically 1.3 microns or greater. In the embodiment discussed here, the silicon substrate is n-type and has <111> orientation, and is doped with phosphorus to a charge carrier concentration of about $0.7$–$2.0 \times 10^{15}$ donors per cubic centimeter.

Figure 2:
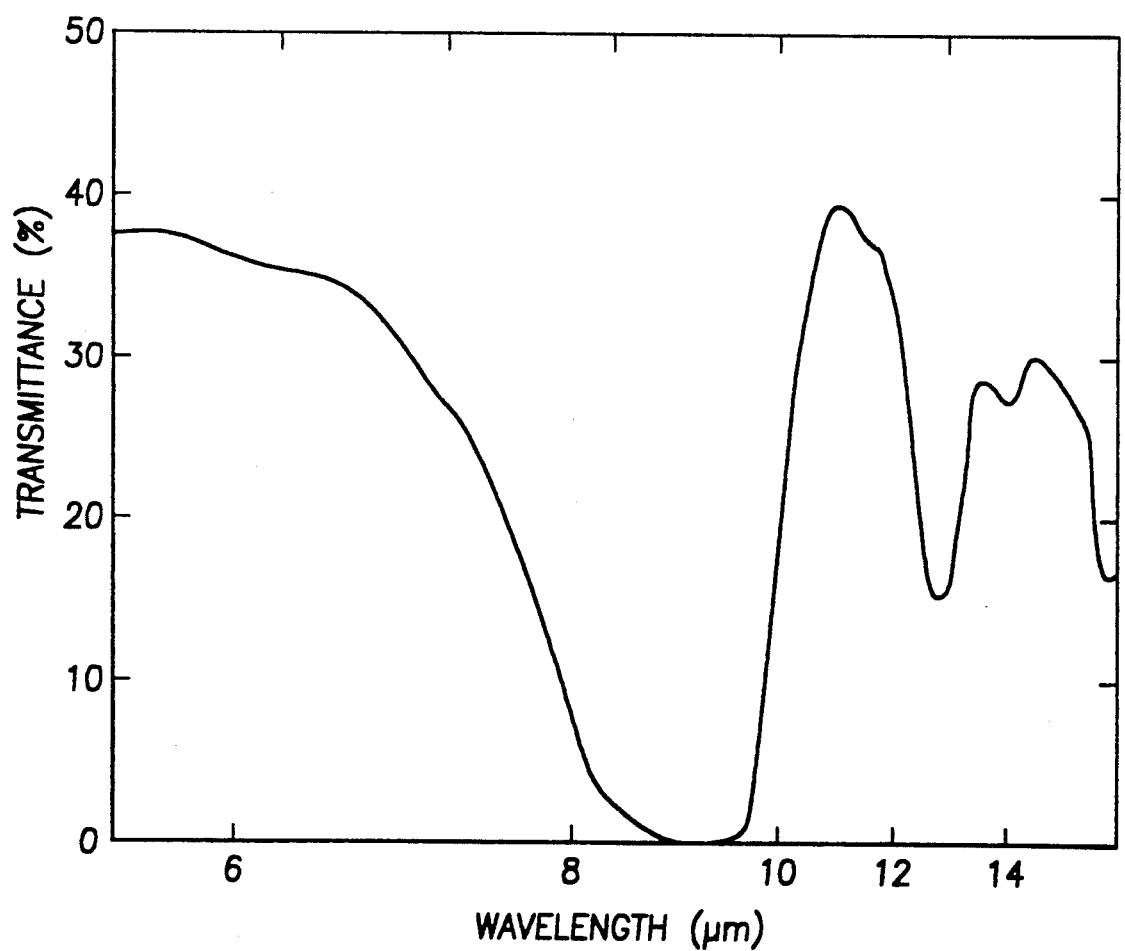
FIG. 2 shows the infrared transmittance spectrum of an oxidized silicon wafer (1).

FIG. 2 shows the transmittance spectrum of the oxidized wafer 1, with both films 2, 7. The strong absorption band extending from about 8.5 to 9.8 microns arises from the Si-O asymmetric vibrational stretching mode that is characteristic of all silicon oxide based materials. The absorption band corresponds to the absorption of radiation energy by excitation of normal modes of vibration in the oxide molecules in which neighboring silicon and oxygen atoms oscillate against each other about their equilibrium interatomic distances. The parameters of the Si-O bond determine the wavelengths at which the absorption occurs. The absorption coefficient is approximately 30,000 per centimeter, and is largely unaffected by the method of film growth or the presence of dopants.

Figure 3:
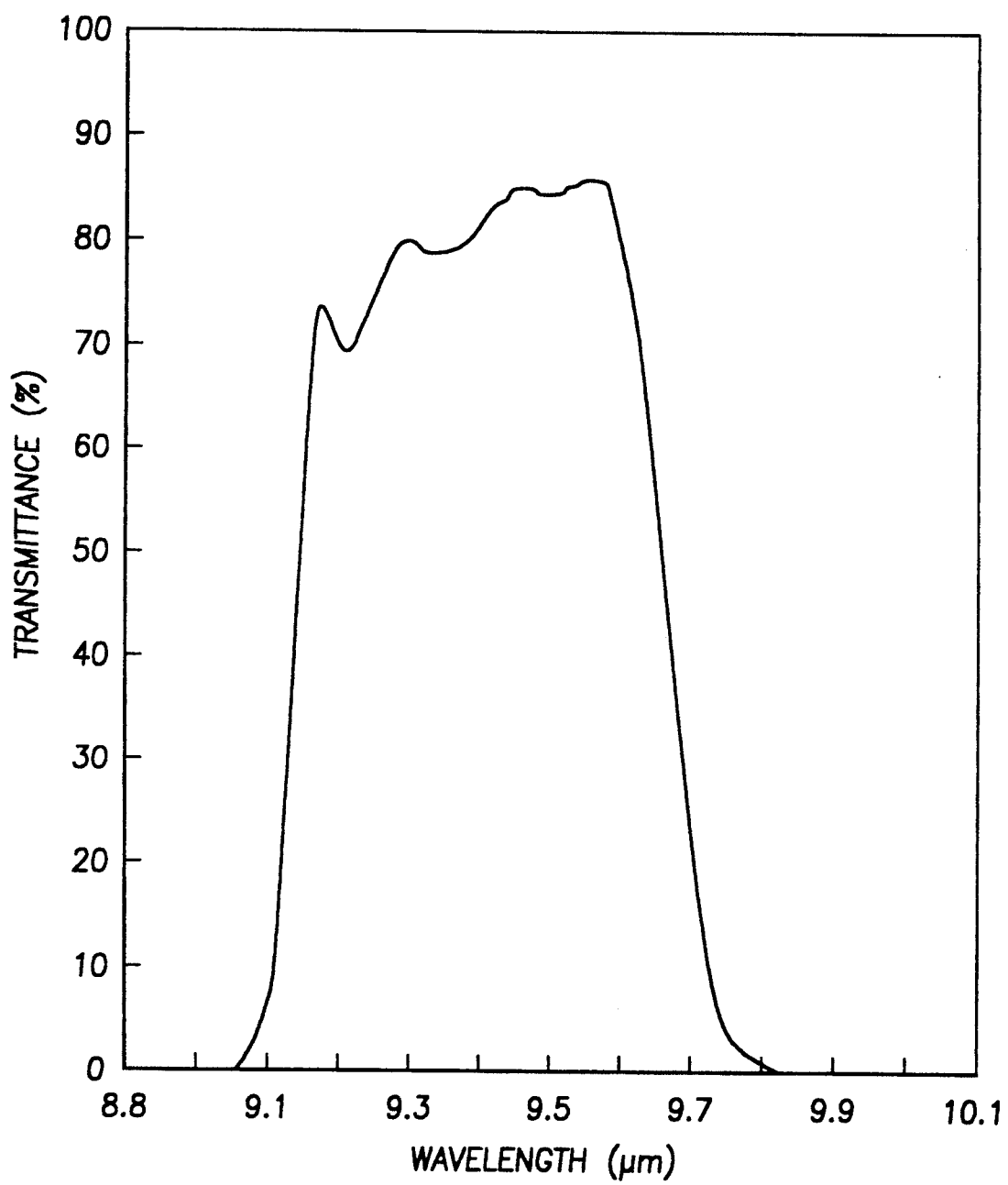
FIG. 3 shows the infrared transmittance spectrum of a 9.4 micron narrow bandwidth filter (5), having a bandwidth of 0.6 microns.

FIG. 3 shows the transmittance of the filter 5 as a function of wavelength according to this invention. The passband is centered at 9.4 microns and has a width of 0.6 microns. Thus, the passband falls completely within the absorption band of FIG. 2. This filter 5 was obtained from Optical Coating Laboratories of Santa Rosa, Calif. and was custom fabricated by this manufacturer to meet this passband specification. The filter 5 is comprised of a germanium slab coated with materials that produce the desired filter 5 properties.

Figure 4:
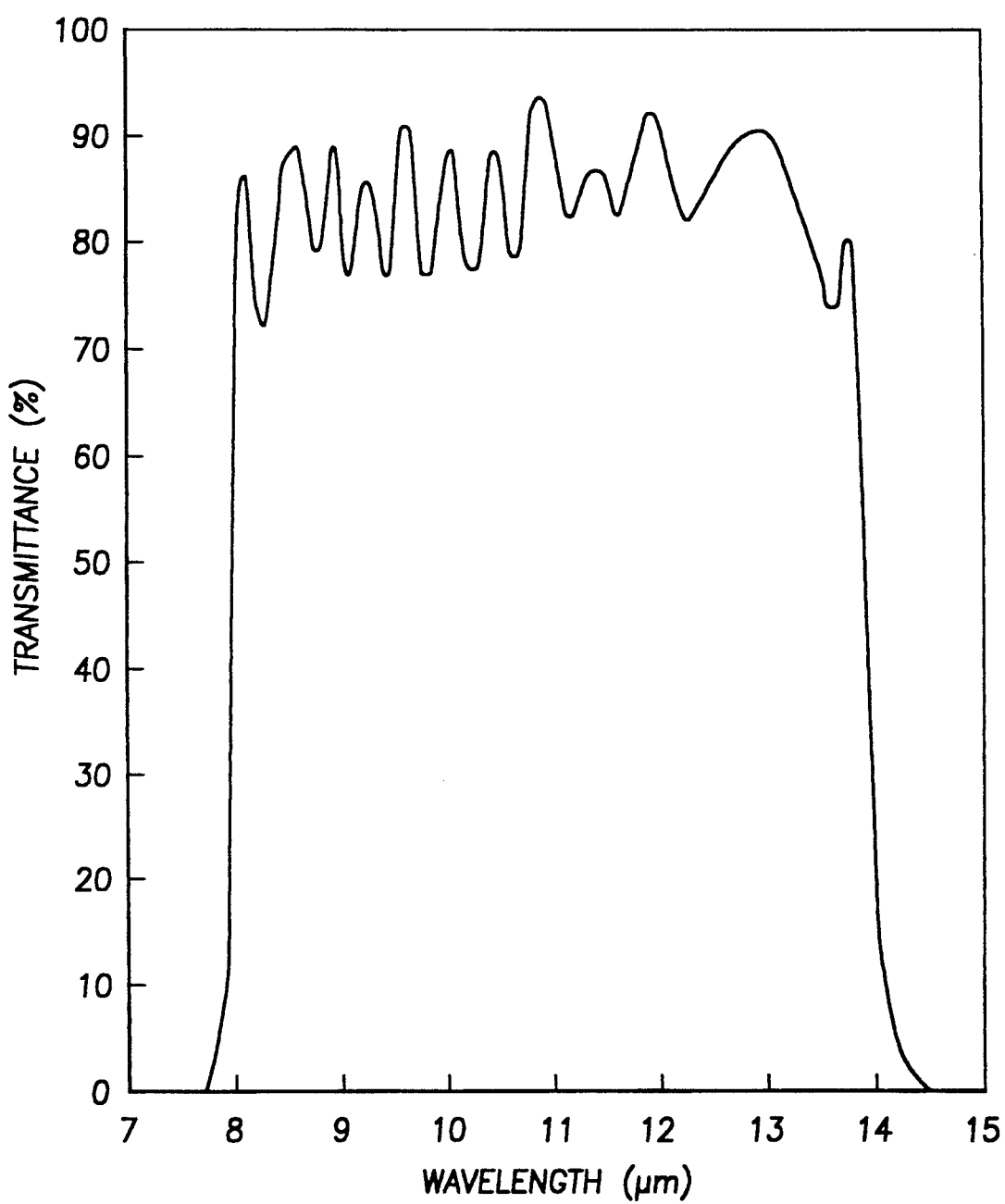
FIG. 4 shows the infrared transmittance spectrum of an 11 micron broad bandwidth filter, having a bandwidth of 6 microns.

For comparison, FIG. 4 shows the transmittance of a broadband filter that has passband centered at 11.0 microns and a bandwidth of 6.0 microns. When substituted for the filter 5 the pyrometer measurements extend over wavelengths from about 8 to 14 microns, where the coated wafer transmittance is not negligible. In this case the variations in emissivity affect the accuracy of the temperature measurements.

Figure 5:
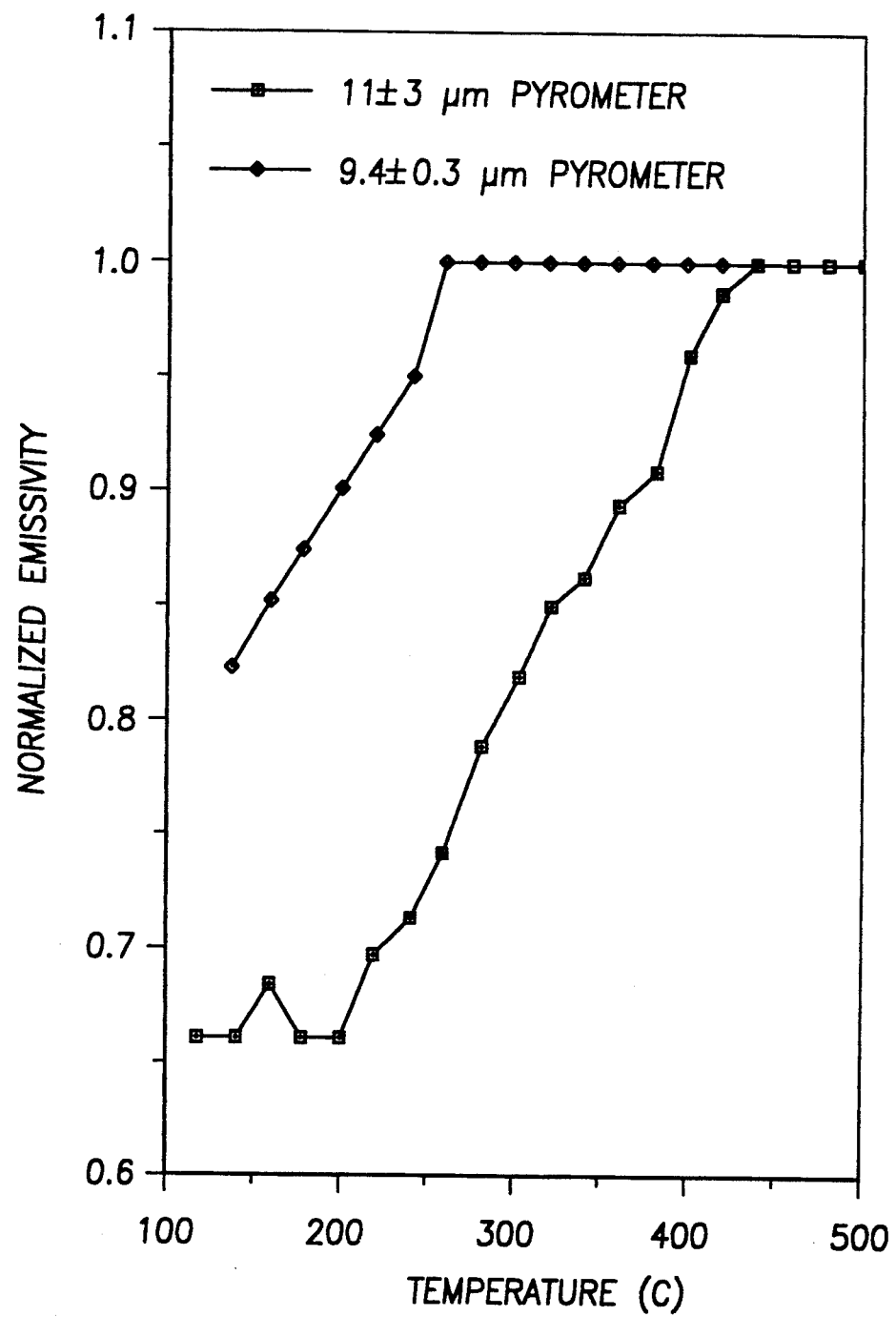
FIG. 5 is a plot of normalized wafer emissivity as a function of wafer (1) temperature for a wafer (1) having the spectrum of FIG. 2, with pyrometer wavelength as a parameter.

FIG. 5 is a plot of the normalized emissivity of the coated wafer as a function of wafer temperature for the two different filters of FIG. 3 and FIG. 4. The emissivity values have all been normalized to that measured at 500° C., where (uncoated) silicon is substantially opaque. For the broadband filter of FIG. 4, the normalized emissivity approaches its maximum value of 0.66 at about 430° C., and remains constant at higher temperatures up to at least 600° C. With the narrow band filter of FIG. 3, the normalized emissivity reaches its maximum value of 0.40 at 270° C., and then remains constant to higher temperatures.

This FIG. shows that by using the narrow band filter 5, the temperature range over which the normalized emissivity of the coated wafer 1, 2 is substantially constant is extended by 160° C. This allows one to make measurements by the pyrometric method down to temperatures where uncoated silicon is normally transparent, without sacrificing accuracy due to emissivity uncertainties. Since the coated wafer remains substantially opaque as viewed by the detector 6, the additional errors from stray radiation of external sources passing through the silicon wafer to the detector are also minimized.

This method requires that the oxide film be sufficiently thick to ensure that the emissivity is dominated by the film absorption band. If the thicknesses of the films 2, 7 are reduced to 0.1 micron, there is a pronounced reduction in the variation of the resulting emissivity for the narrow-band filter 5 compared to the broadband filter, but this reduction is not large enough to be considered useful for improving the accuracy of temperature measurements at lower temperatures where silicon is normally transparent.

The oxide film 7 on the back side of the wafer 1 has only a minor effect on these results. Removing this film 7 raises the temperature at which the emissivity is a maximum in the narrowband filter system from 270° to 285° C., without affecting the maximum emissivity value.

The films 2, 7 according to this invention are not restricted to oxides of silicon. Silicon wafers 1 coated with silicon nitride can be measured in a similar manner by using a narrow-band filter 5 having a passband falling within the absorption band of Si-N. More generally, any film 2, 7 having a strong absorption band may be used by selecting a filter 5 having a passband lying within this absorption band.

The foregoing disclosure of the preferred embodiments of the invention has been presented for purposes of illustration and description. It is not intended to be exhaustive or to limit the invention to the precise form disclosed, and, obviously, many modifications and variations are possible in light of the above teaching. The embodiment was chosen and described in order to best explain the principles of the invention and its practical applications to thereby enable others skilled in the art to best utilize the invention in various embodiments and with various modifications as are suitable to the particular use contemplated. It is intended that the spirit and scope of the invention are to be defined by reference to the claims appended hereto.

What is claimed is:

1. A pyrometric system for measuring the temperature within a selected temperature range of a thermally radiating object comprising:
   (a) a coating placed on said object, said coating being composed of material having an absorption band for attenuating electromagnetic radiation emitted from said object, said material having known emissivity over said temperature range,
   (b) focusing means for collecting and focusing electromagnetic radiation emitted by said coated object,
   (c) a narrow passband filter in the field of said collected and focused radiation, wherein the passband of said filter lies within said absorption band, and,
   (d) a radiation detector for measuring the amount of radiation passing through said filter.

2. A pyrometeric system as recited in claim 1, wherein said material is comprised of oxides of silicon, and wherein said passband is centered at a wavelength of approximately 9.4 microns.

3. A pyrometeric system as recited in claim 2, wherein said passband has a width not substantially greater than 0.6 microns.

4. A pyrometeric system as recited in claim 2, wherein said coating has a thickness not substantially less than 1.3 microns.

5. A pyrometeric system as recited in claim 1, wherein said material is comprised of nitrides of silicon.

6. A pyrometeric system as recited in claim 1, wherein said radiation detector comprises a photoconductive cell.

7. A method for measuring the temperature of a thermally radiating object, said method comprising the steps of:

coating a surface of said object with a film of material having an absorption band;

collecting and focusing electromagnetic radiation emitted by said coated object;

filtering said collected and focused radiation through a narrow-band filter having a passband within said absorption band of said film material;

measuring the amount of said radiation passing through said narrow band filter; and determining the temperature of said object from the measured amount of said radiation and the emissivity of said film material.

8. A method as recited in claim 7, wherein said film material comprises an oxide of silicon.

9. A method as recited in claim 8, wherein said passband is centered substantially at a wavelength of 9.4 microns.

10. A method as recited in claim 9, wherein said passband has a wavelength width not greater than 0.6 microns.

11. A method as recited in claim 8, wherein said film of coated material has a thickness not substantially less than 1.3 microns.

12. A method as recited in claim 7, wherein said film material comprises a nitride of silicon.

13. A method as recited in claim 7, wherein said absorption band arises from the vibrational stretching mode of the molecules of which said film material is comprised.

14. A method as recited in claim 7, wherein said surface coated with said film comprises a portion of the total surface of said object.

* * * * *